United States Patent [19]
Climent et al.

[11] Patent Number: 4,876,551
[45] Date of Patent: Oct. 24, 1989

[54] APPARATUS FOR THE DETECTION OF AN ELECTROMAGNETIC PULSE, MORE PARTICULARLY DUE TO A NUCLEAR EXPLOSION

[75] Inventors: Jean-Pierre Climent, St. Germain les Corbeil; Georges Petelet, Escurolles; Jean-Claude Tronel, Bretigny sur Orge, all of France

[73] Assignee: Commissariat a l'Energie Atomique, Paris, France

[21] Appl. No.: 66,760

[22] Filed: Jun. 26, 1987

[30] Foreign Application Priority Data

Jun. 26, 1986 [FR] France ............................ 86 09294

[51] Int. Cl.[4] ............................................ G01S 3/02

[52] U.S. Cl. ............................... 342/460; 324/72; 324/76 A

[58] Field of Search ............... 342/460; 324/72, 76 A

[56] References Cited

U.S. PATENT DOCUMENTS

| | | | |
|---|---|---|---|
| 3,467,826 | 9/1969 | Cotterman . | |
| 3,483,559 | 12/1969 | Korzekwa et al. | 342/460 |
| 3,605,096 | 9/1971 | Fothergill et al. | 342/360 |
| 3,654,916 | 4/1972 | Neilson . | |
| 3,753,117 | 8/1973 | Downing et al. | 324/72 |
| 3,790,884 | 2/1974 | Kohl | 324/72 |
| 3,982,058 | 9/1976 | Hill | 174/2 |
| 4,044,258 | 8/1977 | Frungel | 324/72 |
| 4,115,732 | 9/1978 | Krider et al. | 324/72 |
| 4,219,804 | 8/1980 | Weischedel . | |
| 4,395,906 | 8/1983 | Ryan et al. | 324/72 |
| 4,422,037 | 12/1983 | Coleman | 324/72 |
| 4,506,211 | 3/1985 | Coleman | 324/72 |

FOREIGN PATENT DOCUMENTS 2119973 8/1972 France .

*Primary Examiner*—Stephen C. Buczinski
*Assistant Examiner*—David Cain
*Attorney, Agent, or Firm*—Kerkam, Stowell, Kondracki & Clarke

[57] ABSTRACT

The invention relates to an apparatus for detecting an electromagnetic pulse having a given origin, more particularly due to a nuclear explosion. This apparatus comprises means for sensing the electrical component of an electromagnetic pulse, means for differentiating a signal supplied by the sensing means from an electromagnetic pulse of a given origin from another pulse and means for taking note of the result of the detection. The differentiation means advantageously comprise means for detecting the passage of the signal supplied by the sensing means at a value exceeding a threshold value, a time counter started by the detection means during the detection of said passage, means for integrating the signal supplied by the sensing means and means for comparing the value of the integrated signal up to time $t_1$ following the starting of the sensor with a reference value.

12 Claims, 8 Drawing Sheets

APPARATUS FOR THE DETECTION OF AN ELECTROMAGNETIC PULSE, MORE PARTICULARLY DUE TO A NUCLEAR EXPLOSION

BACKGROUND OF THE INVENTION

The present invention relates to an apparatus for the detection of an electromagnetic pulse, more particularly due to a nuclear explosion.

The invention applies to the detection of all given electromagnetic pulses and particularly an electromagnetic pulse due to a nuclear explosion, the detection of an electromagnetic pulse of this type e.g. making it possible to provide protection against nuclear attacks.

The invention aims at providing an apparatus making it possible to detect electromagnetic pulses and differentiate between the electromagnetic pulse to be detected and interference electromagnetic pulses.

SUMMARY OF THE INVENTION

The present invention specifically relates to an apparatus for the detection of an electromagnetic pulse of a given origin, wherein it comprises at least one detection system incorporating means for sensing the electrical component of an electromagnetic pulse, said means supplying an electric signal proportional to the sensed electrical component, as well as differentiating means connected to the sensing means, for differentiating an electric signal supplied by the sensing means coming from an electromagnetic pulse with a given origin to be detected from another electromagnetic pulse.

The electromagnetic pulse having a given origin to be detected is advantageously an electromagnetic pulse from a nuclear explosion, such as a high altitude nuclear explosion, whereby said electromagnetic pulse has to be differentiated from another electromagnetic pulse, such as one due to lightning.

There are two types of nuclear explosion, namely nuclear explosions close to the earth's surface or at low altitude and extraatmospheric or high altitude nuclear explosions. A low altitude nuclear explosion produces electromagnetic pulses in a hemisphere with a diameter of a few kilometres, as well as significant destructive effects, whereas a high altitude nuclear explosion virtually only generates electromagnetic pulses, but over a very wide area. Thus, e.g. a nuclear explosion at an altitude of 300 km produces electromagnetic pulses over a region with a diameter of approximately 1500 km and a thickness of 20 km. Therefore these electromagnetic pulses are radiated towards the earth's surface due to the earth's magnetic attraction, leading to destruction or interference to electronic equipment, as well as the communications supply, control or checking network.

It is therefore of significance to detect an electromagnetic pulse produced by a high altitude nuclear explosion, so as to make it possible to protect components liable to be destroyed or interfered with by electromagnetic pulses of this type.

However, a high altitude nuclear explosion produces electromagnetic pulses having similarities with electromagnetic pulses due to natural phenomena, such as lightning. Moreover, so as not to unnecessarily put the protection means into operation, the detection apparatus according to the invention must also make it possible to differentiate between an electromagnetic pulse due to a high altitude nuclear explosion and some other electromagnetic pulse, particularly due to lightning. The same obviously applies concerning the detection of electromagnetic pulses due to other phenomena.

Thus, the detection apparatus according to the invention takes account of at least one of the differences encountered in the phenomena to be differentiated. Thus, e.g. in order to differentiate an electromagnetic pulse due to a high altitude nuclear explosion from that due to lightning, various criteria must be used. Lightning is preceded by the appearance of an electrostatic field and is accompanied by noise and light, whereas a nuclear explosion has no precursor phenomenon and is accompanied by neither noise nor light. In addition, the use of means for detecting an electrostatic field and/or noise and/or light make it possible to distinguish these two phenomena.

It is also possible to take into consideration the characteristics of the electric signal due to an electromagnetic pulse, said signal rising and then falling with a peak value corresponding to the maximum value of the signal.

For an electromagnetic pulse due to a nuclear explosion, the rise time of the corresponding electric signal from a zero value to its maximum value is approximately 10 ns and from 10–90% of its maximum value approximately 5 ns, whilst the mid-height width of this signal, or in other words the time which elapses between two successive passages of the signal at 50% of its maximum value, is approximately 100–200 ns, said signal having completely disappeared at the end of 2 μs. Moreover, the amplitude of said signal is approximately 20–50 kV/m and the polarisation thereof approximately 0°–27° with respect to a horizontal axis.

The electric signal corresponding to an electromagnetic pulse produced by lightning has a rise time which is a function of the distance between the detection apparatus and the discharge (for a distance of 200 m, the rise time from a zero value to the maximum value is approximately 200 ns), the mid-height width of said signal being approximately 1 ms and the duration of the signal exceeding 2 ms and generally approximately one second. Moreover, the amplitude of this signal is also a function of the distance from the detection apparatus to the discharge (for a discharge of 200 m, the amplitude is 10 kV/m and for a distance of 3 km the amplitude is 30–200 V/m). The polarisation of this signal is perpendicular to a horizontal axis.

The detection apparatus according to the invention makes it possible to differentiate an electromagnetic pulse more particularly due to a nuclear explosion, from another electromagnetic pulse e.g. due to lightning by taking into account the total duration of the electric signal corresponding to the pulse to be detected, its mid-height width, its energy and its polarisation. However, to increase the reliability of this apparatus, supplementary criteria can obviously be taken into account, such as the rise time of the electric signal, the magnetic component of the electromagnetic pulse and, in the case where the electromagnetic pulse to be differentiated is lightning, the noise, light and electrostatic field linked with the lightning.

Advantageously, the sensing means comprise a sensor formed by first and second antennas arranged in two perpendicular vertical planes and which are interconnected, the first antenna also being connected to differentiation means, the first antenna forming an angle from 80°–135° with the second antenna and the second antenna forming an angle from 45°–65° with a vertical axis. The position of these two antennas has been calculated so as to ensure the obtaining of an electric signal at the output of the first antenna in the case of a nuclear explosion, no matter what the position of said antenna with respect to the centre of the explosion. The calculation performed more particularly takes account of the polarisation of the electrical component of an electromagnetic pulse due to the nuclear explosion. Preferably, the angle between the first and second antennas is equal to 90° and the angle between the second antenna and a vertical axis is equal to 54°.

In order to protect the sensor against natural attacks, it is preferably located in an enclosure which is transparent to electromagnetic waves, such as a radome.

As the sensor is at high impedance and the differentiation means at low impedance, the first antenna is connected to the differentiation means by means of an impedance matching device effecting the transfer of the electric signal supplied by the high impedance sensor to the low impedance differentiation means.

The sensing means, formed by the two antennas and the impedance matching device, supply an image of the sensed electrical component, the signal supplied by these means being proportional to said component.

Advantageously, the differentiation means incorporate re-setting means to enable the detection apparatus to operate continuously.

According to a first embodiment of the apparatus according to the invention, the differentiation means comprise:

- first detection means connected to the sensing means, in order to detect the passage of the electric signal supplied by the sensing means at a value higher than the given threshold value,
- a first time counter connected to the first detection means, started by said means during the detection of the passage of the electric signal at a value higher than the threshold value,
- integration means connected to the sensing means for integrating the electric signal supplied by the sensing means and
- first comparison means connected to the integration means and to the first time counter, for comparing the value of the electric signal integrated up to a time $t_1$ after the starting of the first counter with a first reference value.

In the case of the differentiation of an electric signal corresponding to a nuclear explosion and to lightning, time $t_1$ and the first reference value are e.g. chosen in such a way that when the value of the electric signal integrated up to time $t_1$ following the starting of the first counter is below the reference value, the electric signal corresponds to a nuclear explosion and in the opposite case to lightning. For example, $t_1$ is equal to 1 ms and the first reference value corresponds to a value higher than that which an electric signal from a nuclear explosion would have integrated up to time $t_1$ following the starting of the first counter. This embodiment permits a differentiation on the energy of the electric signal.

According to a variant of this embodiment, the differentiation means also comprise:

- a second time counter connected to the first detection means and started by said means during the detection of the passage of the electric signal at a value higher than the threshold value
- second detection means connected to the sensing means and to the second time counter, for detecting the maximum value of the electric signal supplied by said sensing means up to a time $t_2$ following the starting of the second counter, time $t_2$ being below time $t_1$,
- second comparison means connected to the second detection means for comparing the maximum detected value by said second detection means with a reference value, said second comparison means controlling the resetting by the resetting means of the integration means and the first counter when the output signal of said second comparison means does not correspond to the detection of an electromagnetic pulse with a given origin.

For example, time $t_2$ is taken as equal to 0.2 ms when time $t_1$ is equal to 1 ms, in the case of the differentiation of signals corresponding to a nuclear explosion and lightning. The second reference value corresponds to the minimum value of the signal to be reached to enable the detection apparatus to continue integration, if not resetting takes place of the integration means and the first time counter. This variant makes it possible to eliminate the low amplitude electric signals due to interfering electromagnetic pulses. The same can be achieved by increasing the threshold value.

According to another embodiment of the apparatus according to the invention, the differentiation means comprise:

- detection means connected to the sensing means for detecting the passage of the electric signal supplied by the sensing means at a value above a given threshold value,
- a time counter connected to the detection means and started by said means during the detection of the passage of the electric signal at a value above the threshold value,
- comparison means connected to the sensing means and to the time counter for comparing the value of the electric signal supplied by the sensing means at a time $t_3$ after the starting of said counter with a reference value.

Thus, in the special case where an electromagnetic pulse due to a nuclear explosion must be differentiated from an electromagnetic pulse due to lightning, time $t_3$ is e.g. taken as exceeding the duration of the electric signal corresponding to a nuclear explosion ($t_3$ e.g. being 2 $\mu s$) and the reference value is zero. Thus, if at time $t_3$ following the starting of the counter, there is a non-zero signal at the output of the comparison means, the electromagnetic pulse will be due to lightning and, in the opposite case, will be due to a nuclear explosion. This embodiment permits a differentiation on the basis of the total duration of the electric signal.

According to another embodiment of the apparatus according to the invention, the differentiation means comprise:

- first detection means connected to the sensing means for detecting the passage of the electric signal supplied by the sensing means with a value higher than a given threshold value,
- a first time counter connected to the first detection means, and started by said means during the detection of the passage of the electric signal at a value above the threshold value,
- second detection means connected to the sensing means for detecting the maximum value of the electric signal supplied by the sensing means,
- calculating means connected to the second detection means for calculating the value of the electric signal at 50% of its maximum value, third detection means connected to the sensing means, to the calculating means and to the first time counter for detecting the passage of the electric signal supplied by the sensing means at a value corresponding to 50% of its maximum value and controlling the stoppage of the first time counter during the detection of said passage and first comparison means connected to the first time counter for comparing the time which has elapsed between the starting and stopping of the first counter and a reference time.

Thus, if it is wished to differentiate between an electromagnetic pulse due to a nuclear explosion and an electromagnetic pulse due to lightning, the reference time is taken as exceeding the mid-height width of the electric signal of an electromagnetic pulse due to a nuclear explosion and below that of the electric signal of an electromagnetic pulse due to lightning. Moreover, when the time which has elapsed between the starting and stopping of the first counter is below said reference time, the electric signal supplied corresponds to a nuclear explosion and in the opposite case to lightning.

This embodiment permits a differentiation on the bases of the mid-height width of the electric signal.

According to a variant of this embodiment, the differentiation means also comprise:

a second time counter connected to the first comparison means and started by said means when the output signal of said means corresponds to the detection of an electromagnetic pulse with a given origin and second comparison means connected to the sensing means and to the second time counter for comparing the value of the electric signal supplied by the sensing means at a time $t_6$ following the starting of the second time counter with a reference value.

For example, time $t_3$ is chosen for time $t_6$ and a zero value for the reference value. This variant permits a differentiation on the basis of the total duration of the electric signal and on the basis of the mid-height width thereof.

In order not to suffer from interference and disturbances due to electromagnetic pulses, as well as the constraints linked with the environment, such as humidity and temperature, the differentiation means are preferably shielded. When the sensing means incorporate an impedance matching device, the latter is also shielded, the shielding of the differentiation means and impedance matching device possibly being of a common nature and constituted by a Faraday cage.

The detection apparatus according to the invention also advantageously comprises autonomous power supply means, such as batteries and photocells located within the shielding of the differentiation means and impedance matching device. Obviously, the detection apparatus can be supplied by an external network, but in this special case the network is preferably protected against the penetration of interference.

Advantageously the detection apparatus according to the invention incorporates means for taking note of the detection of an electromagnetic pulse with a given origin and/or another electromagnetic pulse linked with the differentiation means.

These means for taking account of the detection e.g. comprise sound and/or visual means preferably located in the shielding, so that e.g. protection means can be put into action in the case of the detection of an electromagnetic pulse having a nuclear origin. These means can also comprise means for automatically controlling e.g. protection devices. In the latter case, the means are outside the shielding and connected to the differentiation means by optical or wire connections or links, the wire connections preferably being protected against the penetration of interference signals.

It is also advantageous to use several detection systems as described hereinbefore in parallel, so that there are the same number of detection diagnoses as there are detection systems, the different diagnoses e.g. being compared to obtain a single more reliable diagnosis. This redundancy e.g. makes it possible to avoid the untimely putting into operation of the protection devices. The various differentiation means used in the inventive detection apparatus having several detection systems are advantageously different, but can obviously also be similar.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Hereinafter reference will be made to the particular example of the detection of an electromagnetic pulse from a nuclear explosion, the electric signal due to this type of electromagnetic pulse having to be differentiated from the electric signal from the electromagnetic pulse due to lightning. However, obviously this example is not limitative.

Figure 1:
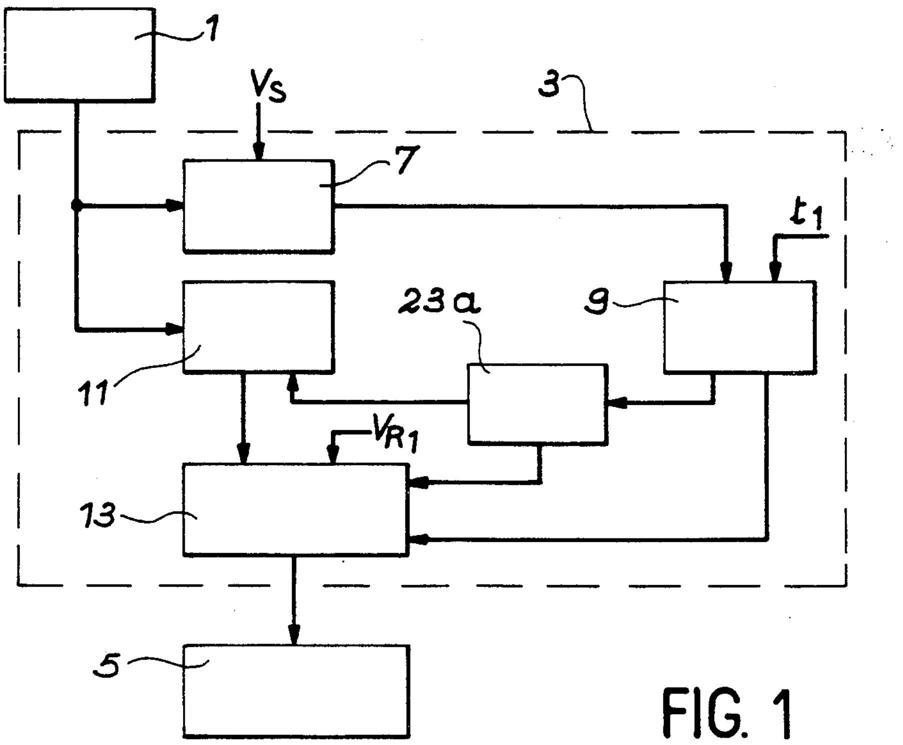
FIG. 1 diagrammatically a first embodiment of a detection apparatus according to the invention.

FIG. 1 diagrammatically shows a first embodiment of a detection apparatus according to the invention. This apparatus comprises means 1 for sensing the electrical component of an electromagnetic pulse, differentiation means 3 and means 5 for taking note of the detection.

Means 1 make it possible to sense the electrical component of an electromagnetic pulse supplying an electric signal proportional to the sensed electrical component. Differentiation means 3 are connected at the output of the sensing means 1. They make it possible to differentiate between an electric signal supplied by the sensing means resulting from an electromagnetic pulse due to a nuclear explosion and an electromagnetic pulse due to lightning. The detection noting means 5 are connected at the output of the differentiation means and make it possible to take account or note the detection of an electromagnetic pulse due to a nuclear explosion and/or lightning.

More specifically, differentiation means 3 incorporate detection means 7 connected to the sensing means 1, a time counter 9 connected to detection means 7, integration means 11 connected to sensing means 1, comparison means 13 connected to the integration means/time counter 9 and means 5 and resetting means 23*a* connected to the time counter, the integration means and the comparison means.

Thus, the electric signal supplied by sensing means 1 is supplied both to detection means 7 and integration means 11. When the value of the electric signal received by means 7 exceeds a given threshold value $V_S$, said means 7 start time counter 9. The starting of time counter 9 is defined by time $t_0$. Moreover, means 11 calculate the integral of the electric signal supplied by the sensing means, no matter what the value of this signal. The value of the integrated signal is compared by means 13 with a reference value $V_{R1}$, said comparison being validated at time $t_1$ following the starting of the counter.

Time $t_1$ and reference value $V_{R1}$ are e.g. chosen in such a way that the integrated value of the electric signal at time $t_1$ following the starting of the counter is below $V_{R1}$ in the case of an electromagnetic pulse due to a nuclear explosion.

The detection noting means 5 comprise visual and/or sound means for notifying man of the result of the comparison and/or means for automatically controlling e.g. protection devices as a function of the result of the comparison.

The threshold value $V_S$ of the detection means 7 is chosen so as to eliminate all the low amplitude electric signals due to interfering electromagnetic pulses. Thus, the validation of this comparison only takes place for signals having an amplitude above value $V_S$. The resetting means 23*a* are started by the time counter following the validation of the comparison, the resetting of the integration means and the comparison means being effected with a regulatable time lag following the starting of the counter.

The differentiation means 3 of this embodiment permit a discrimination with respect to the energy of the electric signal supplied by the sensing means 1.

Figure 3:
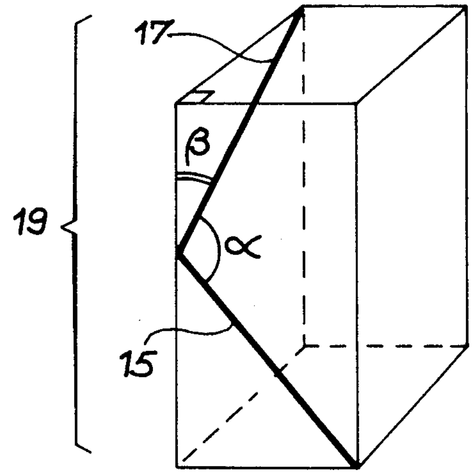
FIG. 3 diagrammatically the spacial arrangement of two antennas forming the sensor of the sensing means of the apparatus according to the invention.
Figure 2:
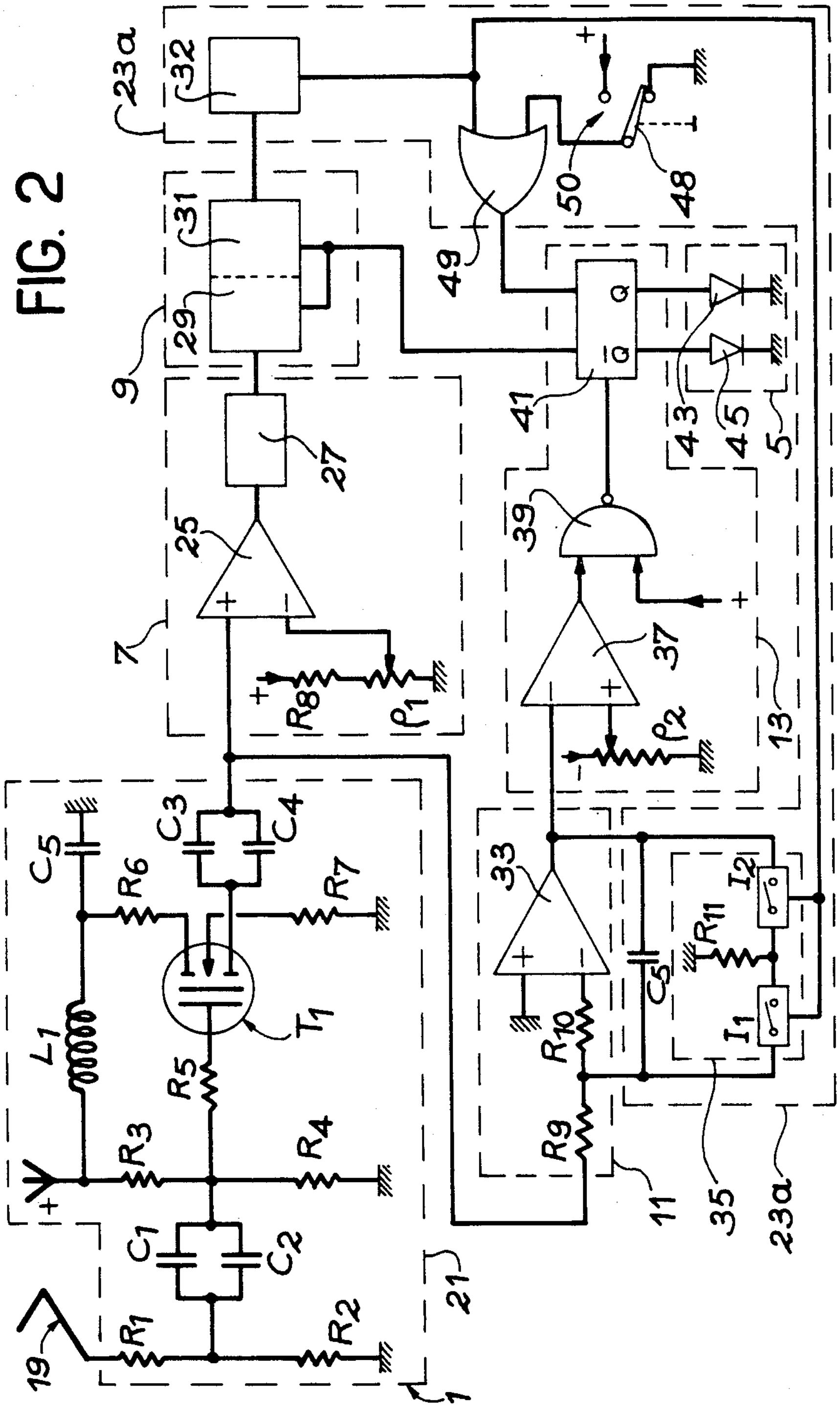
FIG. 2 diagrammatically a more detailed embodiment of the detection apparatus shown in FIG. 1.
Figure 4A:
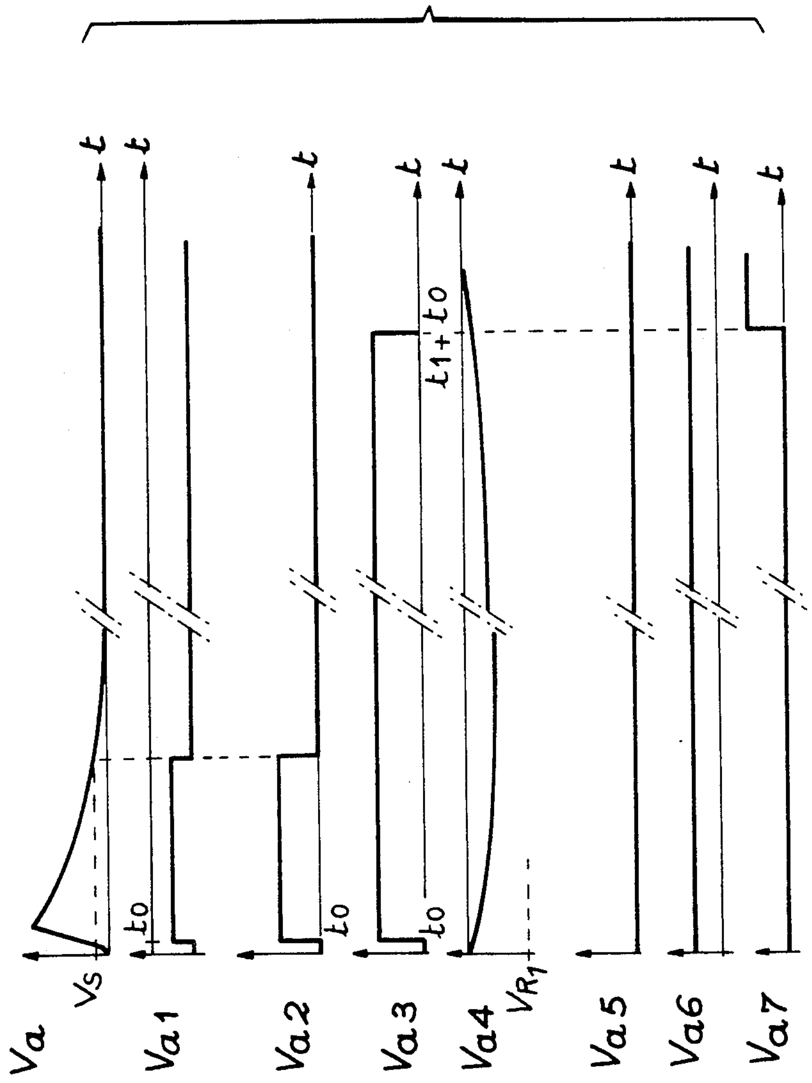
FIGS. 4*a* and 4*b* diagrammatically timing diagrams of signal supplied by the sensing means and by the main elements of the differentiation means shown in FIG. 2, respectively corresponding to an electromagnetic pulse due to a nuclear explosion and an electromagnetic pulse due to lightning.
Figure 4B:
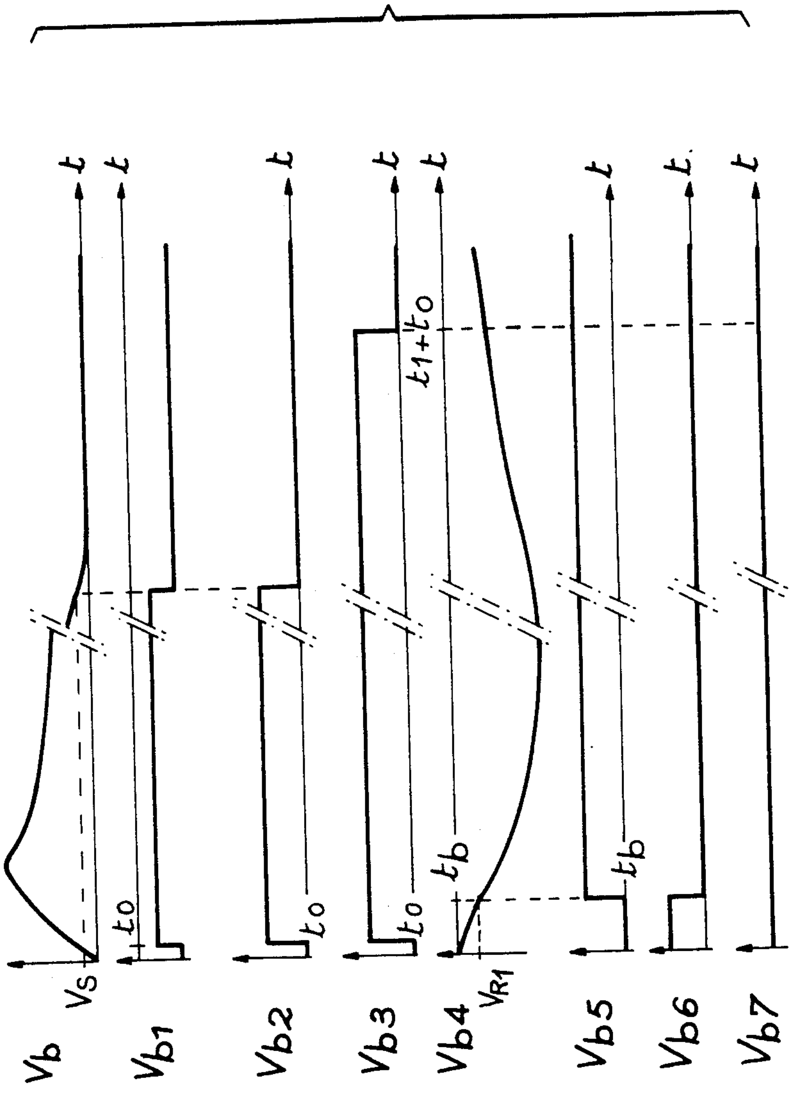

FIG. 2 gives a more detailed variant of the embodiment of the detection apparatus shown in FIG. 1. It shows the sensing means 1 incorporating a sensor 19 and an impedance matching device 21 connected to detection means 7 and integration means 11, comparison means 13 connected to means 11, a time counter 9 connected to detection means 7, to resetting means 23*a* and comparison means 13, means 23*a* also being connected to the integration and comparison means 11, 13 respectively. Sensor 19 of sensing means 1 incorporates first and second antennas 15,17 shown in space in FIG. 3.

The arrangement of these two antennas in space has been calculated in such a way as to obtain in the case of a nuclear explosion an electric signal at the output of the sensing means 1, no matter what the orientation of these antennas with respect to the explosion. Thus, the arrangement of these antennas has in particular been calculated as a function of the polarisation of the electrical component of an electromagnetic pulse due to a nuclear explosion. As shown hereinbefore, the electrical component of an electromagnetic pulse of this type is polarised in accordance with an angle from zero to 27° with respect to a horizontal axis, whereas the polarisation of an electrical component due to lightning is perpendicular to the horizontal axis.

Furthermore, for sensing in a preferred manner the electrical component corresponding to an electromagnetic pulse having a nuclear origin, antennas 15 and 17 are in two perpendicular vertical planes, antenna 15 forming an angle $\alpha$ of approximately 90° with antenna 17 and antenna 17 an angle $\beta$ of approximately 54° with a vertical axis. The particular arrangement of these antennas makes it possible to carry out a differentiation with respect to the polarisation of the electrical component of an electromagnetic pulse. These two antennas have respectively lengths of approximately 3 cm.

In order not to derive the electric signal at the output of the sensor by loading the same on a low load resistance (e.g. 50 ohms) matched to the differentiation means, or so as not to introduce high time constants by loading the sensor on a high load resistance (e.g. 1 Mohm), sensing means 1 advantageously incorporate an impedance matching device 21 connected to the output of antenna 15.

This impedance matching device is at high impedance on the side of sensor 19, so that the signal is not deformed by high time constants, and is at low impedance on the side of the differentiation means 3, so as to match the high impedance of sensor 19 to the low impedance of differentiation means 3 without deriving the signal supplied by sensor 19.

For this purpose, the impedance matching device 21 of sensing means 1 incorporates a power transistor $T_1$. Between the output of the sensor 19 and power transistor $T_1$ are provided two resistors $R_1$, $R_2$ in series, resistor $R_1$ being connected to antenna 15 and resistor $R_2$ to earth or ground, two resistors $R_3$, $R_4$ also in series, resistor $R_3$ being connected to a positive power supply and resistor $R_4$ to ground and two capacitors $C_1$, $C_2$ in parallel connected between the centre of resistors $R_1$ $R_2$ and the centre of resistors $R_3$ $R_4$, the centre of resistors $R_3$ $R_4$ also being connected to the power transistor $T_1$ by a resistor $R_5$. This power transistor $T_1$ is connected to the detection means 7 and to the integration means 11 by two capacitors in parallel $C_3$, $C_4$. A resistor $R_7$ is also connected between one terminal of transistor $T_1$ and ground.

Resistor $R_5$ makes it possible to attenuate rebounds and overshoots without excessively increasing the rise time of the electric signal. Moreover it is advantageously possible to use an inductance $L_1$ connected on the one hand to the end of resistor $R_3$ and on the other hand both to earth via a capacitor $C_5$ and to the power transistor $T_1$ by a resistor $R_6$ in order to provide a better response to the current peaks supplied by the sensor.

The main power sources or supplies are indicated by an arrow and form part of the previously described power supply means. Alongside each arrow is shown a symbol + when the supply is positive and a symbol − when the supply is negative.

The following table gives an example of the values allocated to the different components of the impedance matching device 21 for a power transistor of the DV 2805 type and a 13.5 volt power supply.

TABLE

| $R_1$ | $R_2$ | $R_3$ | $R_4$ | $R_5$ | $R_6$ | $R_7$ | $C_1$ | $C_2$ | $C_3$ | $C_4$ | $C_5$ | $L_1$ |
|---|---|---|---|---|---|---|---|---|---|---|---|---|
| 20 MΩ | 1 MΩ | 9.8 MΩ | 10 MΩ | 330 Ω | 10 Ω | 56 Ω | 1 nF | 47 μF | 1 nF | 100 μF | 22 μF | 4.7 μH |

The means 7 for the detection of the passage of the electric signal at a value exceeding a given threshold value $V_S$ connected at the output of sensing means 1 must preferably have an adjustable starting threshold, start the time counter 9 as quickly as possible when a value of the electric signal supplied exceeds the threshold value $V_S$, have a high input impedance so as not to disturb the electric signal and finally have an output level compatible with the other elements of the differentiating means 3.

Thus, advantageously, the detection means 7 comprise a fast comparator 25, such as an AD 9685 comparator manufactured by Analog Device, whose propogation time is approximately 2.2 ns. However, as this component forms part of the group of ECL logic levels, it must be followed by a translator 27 making it possible to make the passage between the ECL logic levels of the AD 9685 comparator and the TTL logic levels of the other elements of the differentiation means 3. This translator is e.g. a MC 10125.

Thus, the positive terminal of comparator 25 is connected at the output of the sensing means 1 and its negative terminal is connected to a potentiometer formed by a variable resistor $\rho_1$, in series with a resistor $R_8$, the other end of resistor $R_8$ being connected to a positive power supply and the other end of the variable resistor $\rho_1$ to ground. The threshold value $V_S$ is consequently adjusted by variable resistor $\rho_1$. The output of comparator 25 is connected to time counter 9 via translator 27.

As soon as an electric signal value exceeding value $V_S$ appears at time $t_0$, the output signal of means 7 e.g. has a rising front or leading edge, which will trigger or start the time counter 9. The function of time counter 9 is to validate the comparison between the value of the energy of the signal supplied, in other words the value of the electric signal integrated up to time $t_1$ following the starting of said counter and the reference value $V_{R1}$. Thus, this time counter must trigger a signal shifted by a fixed time $t_1$ with respect to time $t_0$.

Thus, time counter 9 advantageously comprises a monostable 29. Time $t_1$ is fixed in the particular case of detecting a nuclear explosion at e.g. 1 ms. The validation of the comparison performed by means 13 is consequently effected 1 millisecond after time $t_0$. Time $t_1$, fixed by the monostable, is regulated by means of external components, such as e.g. a capacitor and a resistor. Moreover, by choosing a variable resistor, it is possible to obtain a variable time $t_1$. It is obvious that the time counter can start at time $t_0$ both on a leading edge and on a trailing edge of the electric signal supplied by means 7 and validate the comparison performed by means 13 both on a leading edge and a trailing edge, as a function of the settings made. The time counter 9 is e.g. a 74 LS 123 component, which has two monostables 29, 31.

Monostable 29 is connected on the one hand to the output of means 7 and on the other to an input of means 13 and to monostable 31, monostable 31 being connected to means 13 and to resetting means 23a. Monostable 29 initiates the validation of the comparison performed by means 13 and monostable 31. Monostable 31 triggered by monostable 29 makes it possible to maintain the comparison result for a certain time following its triggering, so as to permit the display of the detection result.

The integration means 11 of the detection apparatus advantageously comprise an integrator, such as an operational amplifier 33 having a high input impedance and of type ADLH 0032 manufactured by Analog Devices. The positive terminal of amplifier 33 is connected to ground, whilst its negative terminal is connected at the output of the sensing means 1 across two series resistors $R_9$ and $R_{10}$ (respectively e.g. approximately 1 kΩ and 2.2 kΩ).

The electric signal supplied by the sensing means 1 is continuously integrated by integrator 13, no matter what the value of said signal. The integrated value of the signal is consequently continuously supplied to comparison means 13.

Comparison means 13 incorporate a comparator 37, such as a differential amplifier. For example, this comparator is a LM 311. Its negative terminal is connected to the output of integrator 13 and its positive terminal to a variable resistor $\rho_2$. Resistor $\rho_2$ is also connected to a negative power supply and to earth. It makes it possible to adjust the reference value $V_{R1}$. Thus, the output signal of comparator 37 is zero when the signal supplied by the integrator is below $V_{R1}$, or in other words when it corresponds to a nuclear explosion, whilst it is non-zero when exceeding $V_{R1}$ in the opposite case.

The comparison means 13 also comprise a logic NAND gate 39 connected to the output of comparator 37 and to a positive power supply. This logic gate makes it possible to invert the electric signal supplied by the comparator, or in other words the output signal of said gate will be non-zero when the output signal of the comparator is zero and vice versa.

Means 13 also comprise a flip-flop 41, e.g. of type MC 14013B, connected to the output of gate 39 and to the output of time counter 9. At time $t_1$, following the triggering of monostable 29, flip-flop 41 records the logic level of gate 39, in other words flip-flop 41 will be at high level when the output signal of gate 39 is non-zero and at low level when it is zero. Thus, monostable 29 validates the comparison at a time $t_1$ following its triggering, by supplying a signal having either a leading edge, or a trailing edge on one input of the flip-flop.

The detection noting means 5 e.g. comprise display means, such as two light-emitting diode 43,45, which advantageously have different colours. Diode 43 is connected e.g. between the output Q of flip-flop 41 of means 13 and ground and diode 45 is connected between output $\overline{Q}$ of said flip-flop and ground. Thus, if the flip-flop is at high level, the signal on output Q will be nonzero and the signal on the output $\overline{Q}$ will be zero, diodes 5 and 7 being respectively switched on and off. However, if the flipflop is at low level, the signal on output Q will be zero and the signal on output $\overline{Q}$ non-zero, diodes 5 and 7 being respectively switched off and on. The detection of an electromagnetic pulse having a nuclear origin is consequently displayed by the switched on diode 5 and the switched off diode 7, the display time being regulated by monostable 31.

The resetting means 23a comprise a monostable 32, e.g. of type 74 LS 123. This monostable 32 is connected to monostable 29 and is triggered by the latter following the display time. Monostable 32 is also connected to the input of a logic OR gate 49, e.g. of type 74 HC 32. The other input of gate 49 is connected to a switch 50 controlled by a push button 48 and the output of said gate is connected to the flip-flop 41 of means 13. When the push button is pushed in, logic gate 49 is connected to a positive power supply and in the opposite case is connected to ground.

Furthermore, the output signal of gate 49 will be non-zero (high level) if at least one of the signals supplied to its input is non-zero, in other words following the triggering of monostable 32, (i.e. when the output signal thereof has a leading edge) or when the push button is pushed in manually. If the two signals at the input of gate 49 are zero, the signal at the output thereof will also be zero. When the electric signal supplied by gate 49 on flip-flop 41 is non-zero, the latter is reset.

Monostables 31 and 32 are regulated in such a way that the resetting of flip-flop 41 occurs sufficiently long after the validation of the comparison by monostable 29 to enable the display means to be read. The time between the validation of the comparison and resetting is e.g. approximately 5 s.

Means **23*a* also comprise, between the center of resistors $R_9$ and $R_{10}$ and the output of operational amplifier 33 of operational means 11, a capacitor $C_5$, e.g. of 2.2 nF, in parallel with a component 35 for permitting the resetting of operational amplifier 33. Component 35 comprises two analog switches $I_1$, $I_2$ in series, connected respectively to monostable 32**. The centre of these switches is connected to ground by a resistor $R_{11}$, e.g. of 2.2 kΩ, said component being e.g. of type MC 4016.

The closing of switches $I_1$ and $I_2$ controlled by monostable 32 at the same time as resetting of flip-flop 11 makes it possible to discharge capacitor $C_5$ and reset the integrator.

FIGS. **4*a* and 4*b* diagrammatically show timing diagrams of the electric signals from an electromagnetic pulse due to a nuclear explosion and due to lightning, supplied by the detection apparatus shown in FIG. 2**. Signals $V_a$, $V_{a1}$, $V_{a2}$, $V_{a3}$, $V_{a4}$, $V_{a5}$, $V_{a6}$, $V_{a7}$ correspond to a nuclear explosion and signals $V_b$, $V_{b1}$, $V_{b2}$, $V_{b3}$, $V_{b4}$, $V_{b5}$, $V_{b6}$ and $V_{b7}$ correspond to lightening.

Signals $V_a$ and $V_b$ represent electric signals supplied by sensing means 1, signals $V_{a1}$ and $V_{b1}$ represent electric signals supplied by the operational amplifier of detection means 7, signals $V_{a2}$ and $V_{b2}$ represent signals at the output of the translator of means 7, signals $V_{a3}$ and $V_{b3}$ represent signals at the output of monostable 29, signals $V_{a4}$ and $V_{b4}$ represent signals at the output of the integrator of means 11, signals $V_{a5}$ and $V_{b5}$ represent signals at the output of the comparator, signals $V_{a6}$ and $V_{b6}$ represent signals at the output of the NAND gate 39 and signals $V_{a7}$ and $V_{b7}$ the signals at the output of the flip-flop of means 5.

However, the form or shape of the electric signals $V_a$ and $V_b$ supplied by means 1 differs when they pass through the threshold value $V_S$ at time $t_0$.

At the output of operational amplifier 25, signals $V_{a1}$ and $V_{b1}$ consequently have a leading edge as soon as the value of the electric signal supplied by sensing means 1 exceeds the threshold value $V_S$, which corresponds to time $t_0$ and a leading edge as soon as the value of the electric signal supplied by means 1 is again below said threshold value $V_S$. Due to the fact that said amplifier is of the ECL type, said signals are negative.

At the output of the translator, the electric signals $V_{a2}$ and $V_{b2}$ are proportional to the signals $V_{a1}$ and $V_{b1}$ supplied by the operational amplifier, but are positive and correspond to TTL logic levels.

At time $t_0$, monostable 29 is triggered, or in other words signals $V_{a3}$ and $V_{b3}$ have a leading edge as soon as the value of the electric signal supplied by the sensing means exceeds a threshold value $V_S$ and at a time $t_1$ fixed following the triggering thereof, monostable 29 is stopped and signals $V_{a3}$ and $V_{b3}$ have a trailing edge.

Integrator 33 continuously integrates the electric signal supplied by sensing means 1, no matter what its value, the electric signals $V_{a4}$ and $V_{b4}$ supplied by the integrator consequently being continuous as from the appearance of a non-zero electric signal at the output of means 1 and up to the disappearance thereof.

Comparator 37 continuously compares the value supplied at the output of integrator 33 with a reference value $V_{R1}$. Thus, the signal $V_{a4}$ supplied by the integrator is still below the reference value, so that the corresponding signal $V_{a5}$ will be zero (low level). Conversely, the electric signal $V_{b4}$ supplied by integrator 33 exceeds the reference value $V_{R1}$, so that a time $t_b$ following the appearance of signal $V_b$ and will have a leading edge at time $t_b$, or in other words will be at high level as soon as the value of the integrated signal exceeds the reference value. Electric signals $V_{a6}$ and $V_{b6}$ are at high level when the corresponding signals $V_{a5}$ and $V_{b5}$ are at low level and vice versa.

As has been shown hereinbefore, the flip-flop assumes the same logic level as gate 39 at time $t_1$ following the triggering of monostable 29. Therefore signal $V_{a7}$ is at high level as from time $t_0+t_1$ and signal $V_{b7}$ remains at low level. Thus, at the output of the flip-flop, at time $t_0+t_1$, there will be a non-zero electric signal in the case of an electromagnetic pulse due to a nuclear explosion and a zero signal in the case of an electromagnetic pulse due to lightning.

Figure 5:
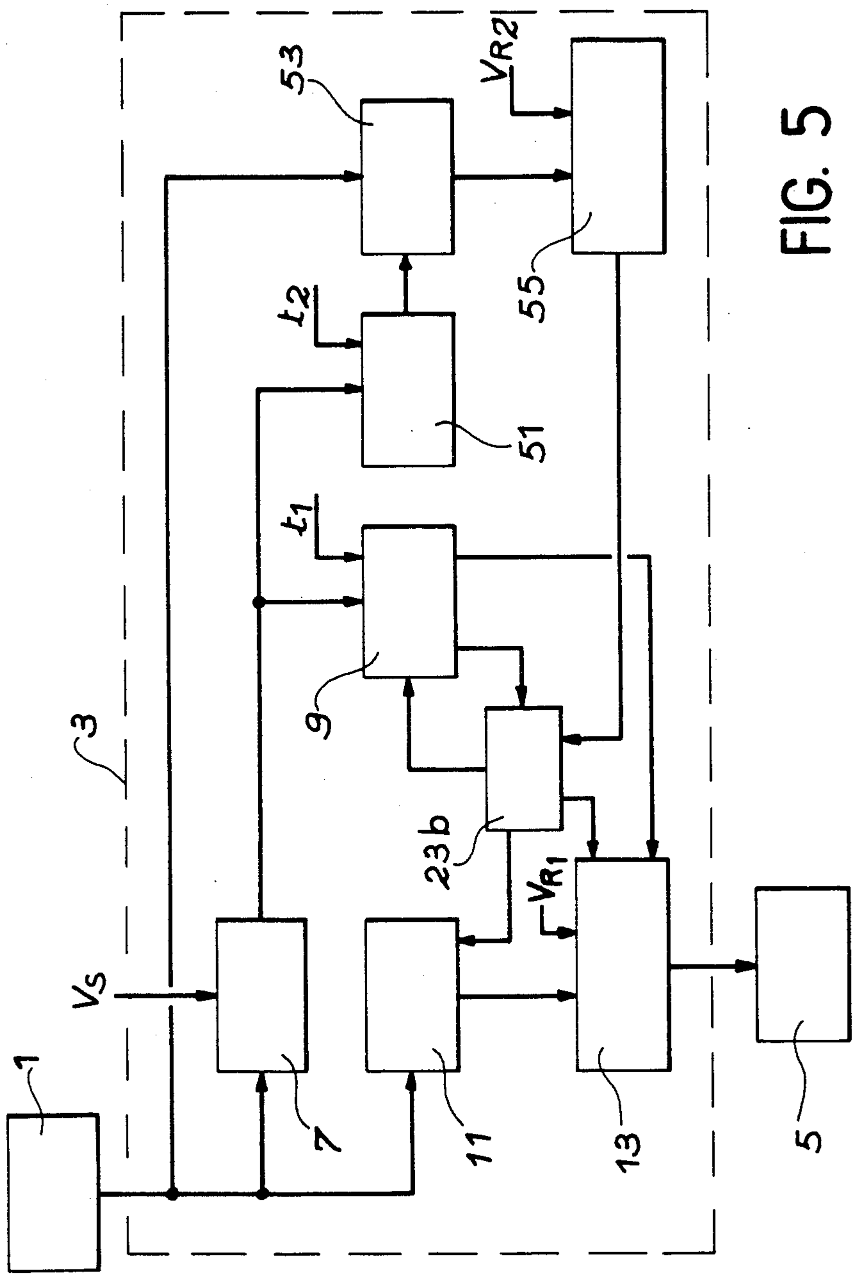
FIG. 5 diagrammatically a variant of the detection apparatus of FIG. 1.

FIG. 5 shows a variant of the detection apparatus of FIG. 1. This variant differs from that of FIG. 1 through the use of a time counter 51, detection means 53 and comparison means 55 of a supplementary nature.

Time counter 51 is connected at the output of detection means 7. Detection means 53 are connected at the output of sensing means 1 and at the output of time counter 51. The comparison means 55 are connected at the output of the detection means. Moreover, the resetting means **23*b* of said apparatus are connected at the output of comparison means 55 and the time counter 9 and at the input of integration means 11, time counter 9 and comparison means 13**.

In the same way as for time counter 9, time counter 51 is triggered during the detection of a value of the electric signal which exceeds the threshold value $V_S$. Detection means 53 make it possible to detect the maximum value of the electric signal supplied by the sensing means 1 up to time $t_2$ following the triggering of counter 51. This time $t_2$ is fixed by counter 51, in the same way as time $t_1$ for counter 9.

Comparison means 55 compare the maximum value detected by said means 53 with a reference value $V_{R2}$. If the maximum value detected is below the reference value, time counter 9 and integration means 11 are reset by means **23*b* triggered by means 55**. In the opposite case, integration is continued.

This particular realisation makes it possible to stop integration and reset the detection apparatus when the detection means have detected electric signals with a value exceeding value $V_S$, but not having high peak values at the end of a time $t_2$ following the starting of counter 51, said apparatus returning to determining a threshold value exceeding $V_S$.

Figure 6:
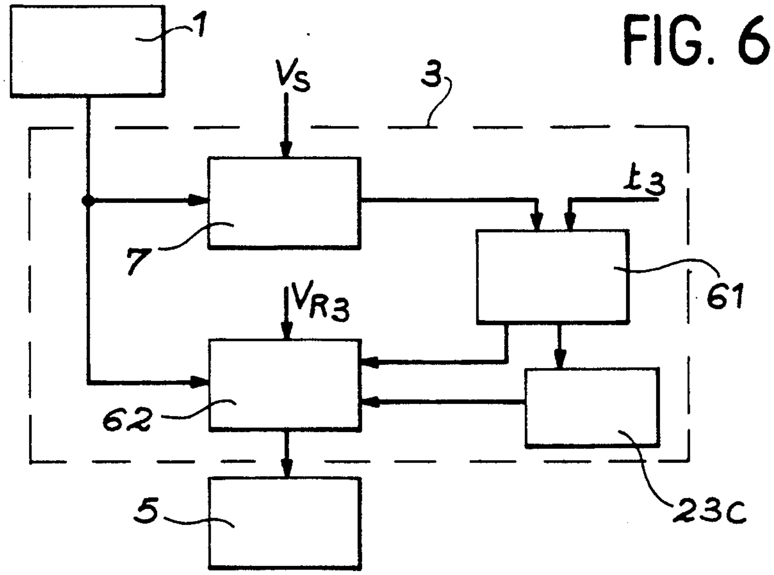
FIG. 6 diagrammatically another embodiment of a detection apparatus according to the invention.

FIG. 6 shows another embodiment of the detection apparatus according to the invention. FIG. 6 shows the sensing means 1, differentiation means 3 and means 5 for noting the detection of an electromagnetic pulse of a given origin and/or another pulse. Means 1 and 5 are e.g. of the same type as described hereinbefore. The differentiation means incorporate detection means 7 of the same type as described hereinbefore connected to the sensing means 1, a time counter 61 connected to means 7, comparison means 62 connected to sensing means 1, to time counter 61 and to means 5 and resetting means 23*c* connected to time counter 61 and comparison means 62.

Advantageously time counter 61 comprises a monostable triggered at time $t_0$ by the detection of a value of the electric signal supplied by sensing means 1 exceeding a threshold value $V_S$. A time $t_3$ after its start, counter 61 stops and validates the comparison performed by means 62 between the value of the signal supplied by means 1 at time $t_3$ after the start of the counter and a reference value $V_{R3}$. Comparison means 62 e.g. comprise a comparator, such as a differential amplifier connected to a flip-flop.

In the case where it is wished to differentiate between an electromagnetic pulse due to a nuclear explosion and that due to some other phenomenon, reference signal $V_{R3}$ is e.g. zero and time $t_3$ equal to 2 $\mu$s. Thus, it has been shown hereinbefore, that after 2 $\mu$s, the electric signal corresponding to a nuclear explosion has disappeared, unlike the electric signal corresponding to lightning.

Furthermore, when the electric signal supplied by the sensing means at time $t_3$ after the start of the counter is zero, the signal at the output of the comparison means 62 will also be zero and means 5 will note the detection of an electromagnetic pulse due to a nuclear explosion. In the opposite case, the signal at the output of means 62 will be non-zero and means 5 will note the detection of an electromagnetic pulse due to lightning. Moreover, the resetting means 23*c* initiated with a certain time lag following the validation of the comparison control the resetting of means 62.

Figure 7:
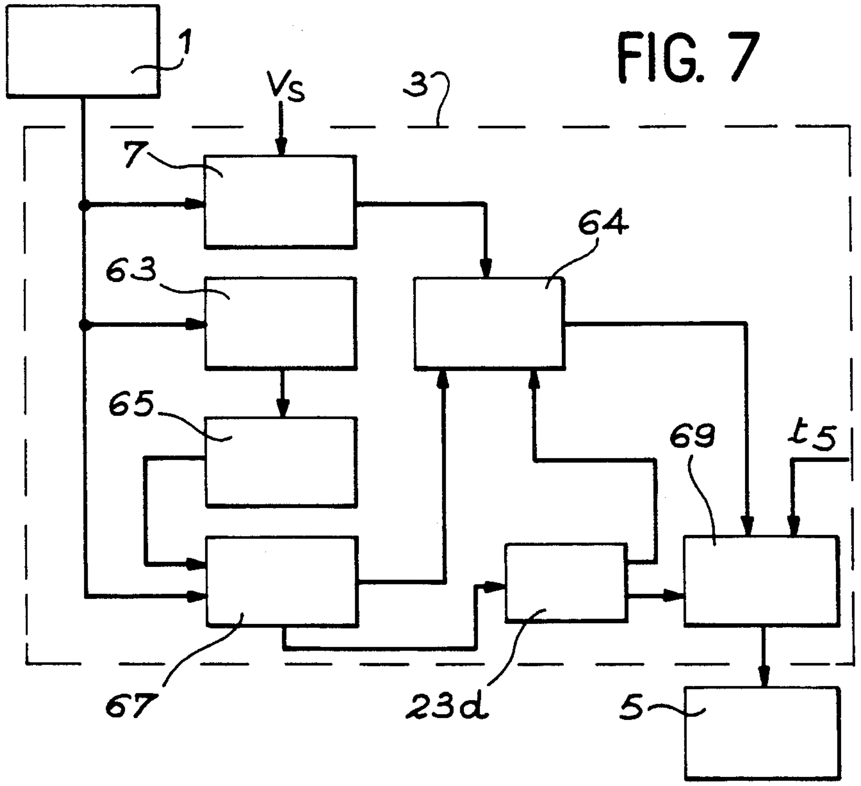
FIG. 7 diagrammatically another embodiment of a detection apparatus according to the invention.

FIG. 7 shows another embodiment of the detection apparatus according to the invention. This apparatus comprises sensing means 1 and means 5 for noting the detection of an electromagnetic pulse with a given origin and/or of another pulse, of the same type as described hereinbefore, as well as differentiation means 3.

Means 3 incorporate detection means 7 connected to the sensing means 1, a time counter 64 connected to means 7, detection means 63 connected to the means 1 for detecting the maximum value of the electric signal supplied by means 1, calculating means 65 connected to means 63 for calculating the value of the signal at 50% of its maximum value, detection means 67 connected on the one hand to the sensing means 1 and to the calculating means 65 and on the other hand to the time counter 64 and resetting means 23*d*, for detecting the passage of the electric signal supplied by means 1 at 50% of its maximum value during the trailing edge or receding front of said signal and comparison means 69 connected on the one hand to time counter 64 and means 23*d* and on the other hand to means 5, means 23*d* being also connected to the time counter 64.

Means 7 are e.g. of the same type as described hereinbefore, whereby means 63, 67 and 69 e.g. comprise a comparator. Means 67 compare the value of the signal supplied by means 1 and the maximum value of the signal supplied, divided by two. As soon as the value of the signal supplied is equal to the maximum value divided by two (or in other words as soon as the signal supplied has again dropped to mid-level of its maximum value), means 67 control the stoppage of counter 64. Between the start and stop of the counter, a time $t_4$ has elapsed, which characterises the mid-height width of the electric signal supplied. Thus, time $t_4$ is compared by means 69 with a reference time $t_5$, such as e.g. when $t_4$ is below $t_5$, the electric signal corresponds to a nuclear explosion and when $t_4$ exceeds $t_5$ the electric signal corresponds to another phenomenon, such as lightning.

Means 5 take note of the detection of these phenomena. Time $t_5$ is e.g. taken as equal to 250 ns.

The resetting means 23*d* triggered by means 67 during the passage of the signal supplied by means 1 at 50% of its maximum value control the resetting of time counter 64 and comparison means 69 with a certain time lag compared with the validation of the comparison.

Figure 8:
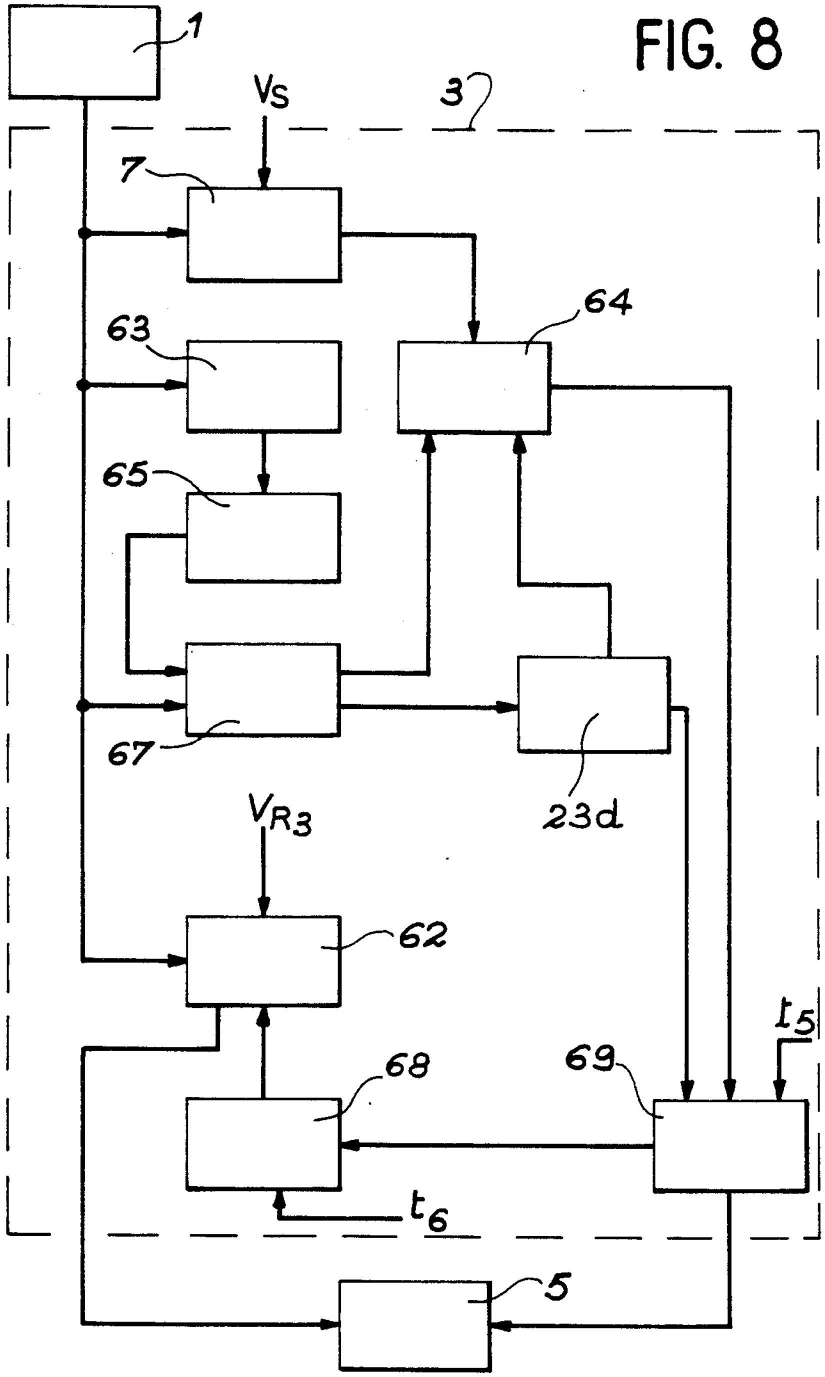
FIG. 8 diagrammatically a variant of the embodiment of the detection apparatus shown in FIG. 7.

FIG. 8 shows a variant of the detection apparatus of FIG. 7.

Differentiation means 3, besides those shown in FIG. 7, comprise detection means 62 and a second time counter 68 of the same type as means 62 and counter 61 described in FIG. 6, detection means 62 being connected to means 1 and means 5 and time counter 68 to means 69 and 62. However, counter 68 is not started by means 7 as in the case of FIG. 6, but by the comparison means 69 solely in the case where the output signal of said means 69 corresponds to the detection of a nuclear explosion. Thus, said counter is started at time $t_4$ following the starting of counter 64 and stopped at time $t_6$ after said time $t_4$. For example, time $t_6$ is 2 $\mu$s.

Detection means 62 compare the value of the signal supplied by the sensing means 1 at time $t_6$ following the starting of counter 68 with a zero value. When the signal at the output of means 62 is zero, means 5 take account of the detection of an electromagnetic pulse due to a nuclear explosion and in the opposite case an electromagnetic pulse due to lightning.

Means 69 and 62 are connected to means 5, whereby the latter can e.g. comprise first and second different display means, respectively connected to means 69 and 62, but they can also incorporate comparison means connected to means 69 and 62 and comprise display means displaying the result of the comparison. Thus, this variant makes it possible to give a double diagnosis and therefore obviate the untimely triggering of the protection devices.

It is advantageous to base the differentiation of electromagnetic pulses on several criteria, in order to increase the reliability of the detection apparatus.

Figure 9:
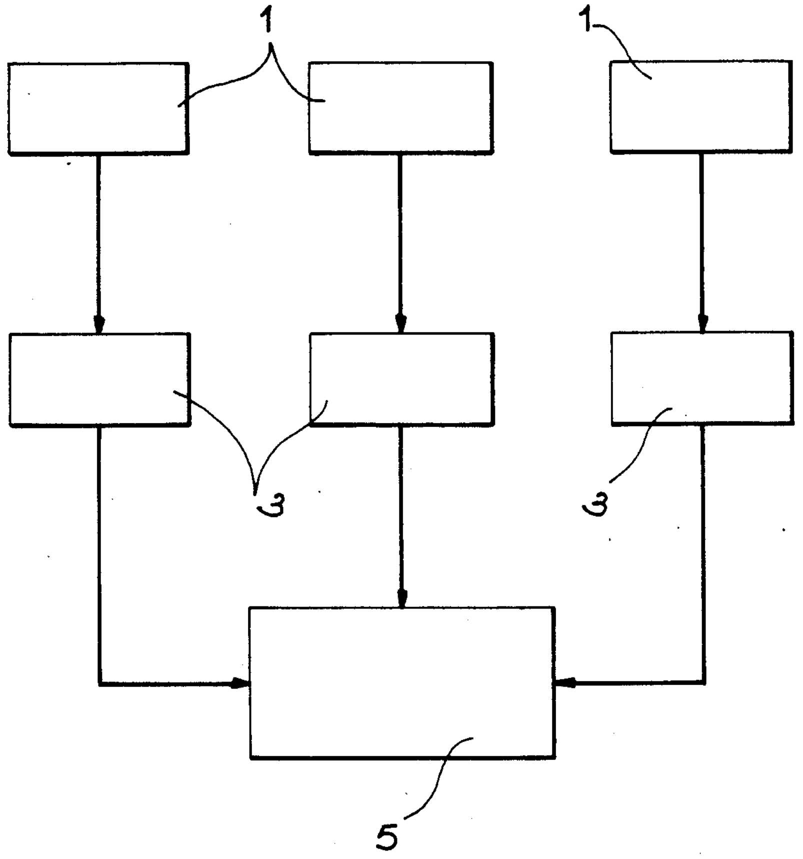
FIG. 9 diagrammatically a detection apparatus having several detection systems according to the invention in parallel.

FIG. 9 diagrammatically shows a detection apparatus having several detection systems in parallel, means 5 of said system being e.g. grouped to permit a comparison of the different diagnoses from the differentiation means 3 used and give a maximum reliability report of the result of the detection. The differentiation means used are preferably different from one another, but can obviously also be identical.

FIG. 9 shows three detection systems in parallel, but the detection apparatus can obviously have more than three. Moreover, it is possible to add to said detection apparatus with a view to improving its reliability and as shown hereinbefore, means for detecting electrostatic fields, noise, light or magnetic fields.

The different embodiments of the detection apparatus described hereinbefore are not limitative and numerous variants are possible thereto without passing beyond the scope of the invention.

What is claimed is:

1. An apparatus for detecting and for discriminating a first electromagnetic pulse due to a nuclear explosion from a second electromagnetic pulse due to another source, comprising at least one detection unit including:

(a) sensing means fixed on the ground for sensing the electrical component of an electromagnetic pulse emanating from a nuclear explosion regardless of the orientation of said fixed sensing means relative to said nuclear explosion, said fixed sensing means supplying an electric signal representative of the polarization of the sensed electrical component of the electromagnetic pulse and being proportional to the sensed electrical component, (b) first detection means connected via an impedance matching device to the fixed sensing means for detecting the passage of the electric signal supplied by the fixed sensing means at a value higher than a predetermined threshold value, (c) a first time counter connected to and started by the first detection means during the detection of the passage of the electric signal at a value higher than the threshold value, (d) integration means connected to the fixed sensing means for integrating the electric signal supplied by the fixed sensing means, and (e) first comparison means connected to the integration means and to the first time counter, for comparing the value of the electric signal integrated up to a time $t_1$ after the starting of the first time counter with a first reference value.

2. The apparatus according to claim 1, wherein the sensing means comprise a sensor formed by interconnected first and second antennas arranged in two perpendicular vertical planes, said first antenna forming an angle from 80° to 135° with the second antenna and said second antenna forming an angle from 45° to 65° with a vertical axis.

3. The apparatus according to claim 2, wherein said sensor further comprises an angle between said first and second antennas of approximately 90° and an angle between said second antenna and a vertical axis of approximately 54°.

4. The apparatus according to claim 2, wherein said sensor further comprises said first and second antennas each having a length of approximately 3 cm.

5. The apparatus according to claim 1, wherein the second electromagnetic pulse associated with another source is due to lightning.

6. The apparatus according to claim 1, wherein the impedance matching device is shielded.

7. The apparatus according to claim 1, wherein said differentiation means comprises means for determining the amplitude and duration of the sensed electromagnetic pulse, means for determining the energy of the sensed electromagnetic pulse and resetting means for enabling the detection apparatus to operate continuously.

8. The apparatus according to claim 1, wherein the differentiation means further comprise: a second time counter connected to and started by the first detection means during the detection of the passage of the electric signal at a value higher than the threshold value, second detection means connected to the fixed sensing means and to the second time counter for detecting the maximum value of the electric signal supplied by said fixed sensing means up to a time $t_2$ following the starting of the second time counter, where time $t_2$ is less than time $t_1$, second comparison means connected to the second detection means for comparing the maximum value detected by said second detection means with a second reference value, said second comparison means controlling the resetting means, which reset the integration means and the first counter when the output signal of said second comparison means does not detect a maximum value associated with an electromagnetic pulse emanating from a nuclear explosion.

9. The apparatus according to claim 1 wherein the differentiation means are shielded.

10. The apparatus according to claim 1 wherein the detection system also comprises autonomous power supply means.

11. The apparatus according to claim 1 further comprising means for taking note of the detection of an electromagnetic pulse emanating from a nuclear explosion and/or an electromagnetic pulse emanating from another source, connected to the differentiation means.

12. The apparatus according to claim 1, further comprising several fixed sensing and detection means connected in parallel.

* * * * *